(No Model.)
H. FLATER.
COMBINED SAW JOINTER AND GAGE.
No. 297,513. Patented Apr. 22, 1884.
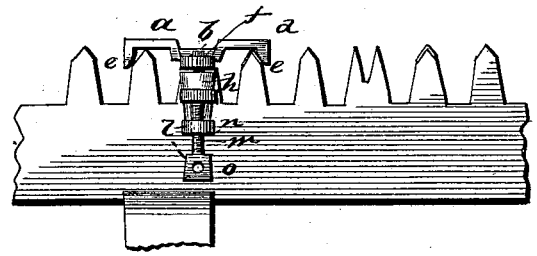
Fig. 1.
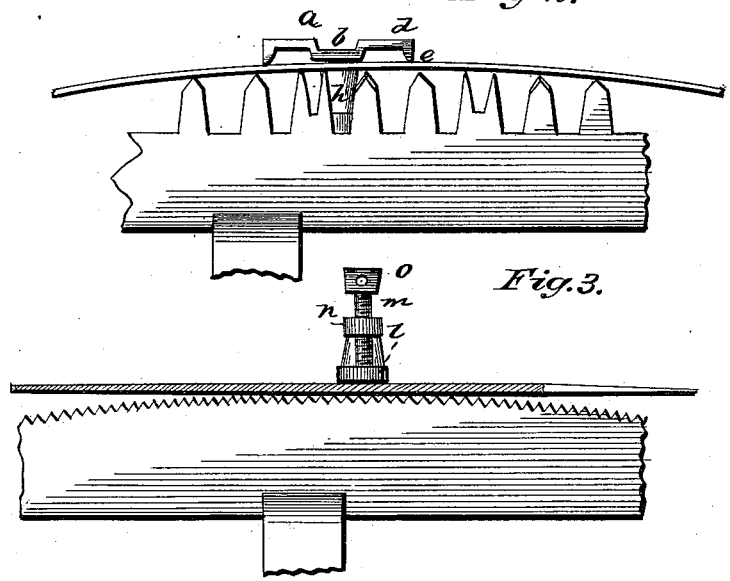
Fig. 2.
Fig. 3.
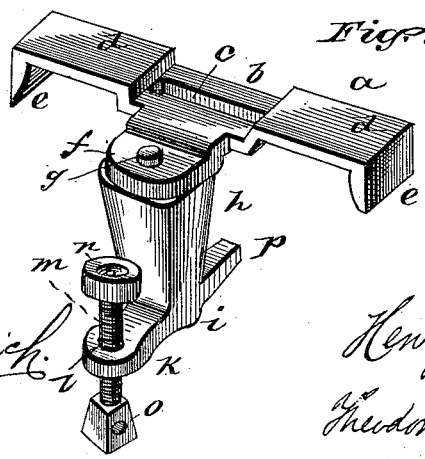
Fig. 4.
WITNESSES
Phil C. Dieterich
A. E. Douck
INVENTOR
Henry Flater
by
Theodor Mangin, Attorney